(12) United States Patent
Li et al.

(10) Patent No.: US 11,316,565 B2
(45) Date of Patent: Apr. 26, 2022

(54) CHANNEL STATE INFORMATION REPORTING IN WIRELESS COMMUNICATIONS

(71) Applicant: ZTE Corporation, Guangdong (CN)

(72) Inventors: Yong Li, Guangdong (CN); Hao Wu, Guangdong (CN); Zhaohua Lu, Guangdong (CN); Yijian Chen, Guangdong (CN); Yu Ngok Li, Guangdong (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 17/245,598

(22) Filed: Apr. 30, 2021

(65) Prior Publication Data

US 2021/0258048 A1    Aug. 19, 2021

Related U.S. Application Data

(63) Continuation of application No. PCT/CN2018/112901, filed on Oct. 31, 2018.

(51) Int. Cl.
*H04B 7/0456*    (2017.01)

(52) U.S. Cl.
CPC .................................. *H04B 7/0456* (2013.01)

(58) Field of Classification Search
CPC ... H04B 1/38; H04B 7/04; H04B 7/06; H04B 7/0456; H04B 7/0478; H04B 7/0626;
(Continued)

(56) References Cited

U.S. PATENT DOCUMENTS

| 10,848,349 B2 | 11/2020 | Liu et al. |
| 2013/0201912 A1 | 8/2013 | Sheng et al. |

(Continued)

FOREIGN PATENT DOCUMENTS

| CN | 107222244 A | 9/2017 |
| CN | 108540188 A | 9/2018 |

(Continued)

OTHER PUBLICATIONS

European Search Report in EP Patent Application No. 18930116.1, dated Oct. 13, 2021, 11 pages.
(Continued)

*Primary Examiner* — Shawkat M Ali
(74) *Attorney, Agent, or Firm* — Perkins Coie LLP

(57) ABSTRACT

A wireless communication method is described for a channel state information reporting method. The reporting method may include a communication node performing the following example operations: (1) Performing differential operation on a sequence of coefficients used to compose the precoding matrix vector with a certain vector, where the differential operation may be performed on adjacent frequency domain units in order to produce a resulting sequence. The sequence of coefficients of the certain vector is a sequence formed by the value of the certain vector's coefficients on the different unit of the frequency domain. (2) The resulting sequence can be transformed to obtain another sequence on another domain. (3) Send back at least some of the data in the another sequence to a network node.

20 Claims, 8 Drawing Sheets

(58) Field of Classification Search
CPC .... H04B 7/0634; H04B 7/0658; H04B 7/216; H04B 17/309; H04L 1/06; H04L 5/00; H04L 5/0048; H04L 25/02; H04L 27/26; H04W 4/00; H04W 24/10; H04W 28/20; H04W 72/00; H04W 72/04
USPC ........ 370/252, 312, 328, 329, 342; 375/219, 375/260, 267, 295, 316
See application file for complete search history.

(56) References Cited

U.S. PATENT DOCUMENTS

2013/0242841 A1   9/2013  Wang
2018/0262253 A1*  9/2018  Rahman ................ H04L 25/021

FOREIGN PATENT DOCUMENTS

WO      2015016589 A1    2/2015
WO      2016045342 A1    3/2016

OTHER PUBLICATIONS

LG Electronics, "Further Analysis on DCT based CQI reporting Scheme," 3GPP TSG RAN WG1 #46-bis, R1-062575, Seoul, Republic of Korea, Oct. 9-13, 2006, 14 pages.
International Search Report and Written Opinion in International Application No. PCT/CN2018/112901, dated Jul. 24, 2019, 6 pages.

* cited by examiner

# CHANNEL STATE INFORMATION REPORTING IN WIRELESS COMMUNICATIONS

CROSS-REFERENCE TO RELATED APPLICATIONS

This application is a continuation of International Patent Application No. PCT/CN2018/112901, filed on Oct. 31, 2018, the contents of which are incorporated herein by reference in their entirety.

TECHNICAL FIELD

This disclosure is directed generally to wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The 5th generation of wireless system, known as 5G, advances the LTE and LTE-A wireless standards and is committed to supporting higher data-rates, large number of connections, ultra-low latency, high reliability and other emerging business needs.

SUMMARY

Techniques for channel state information reporting are disclosed. An exemplary wireless communication method is disclosed. The exemplary method includes transmitting, by a communication node, at least some elements of a first sequence of coefficients. The at least some elements are located at fixed sequence positions in the first sequence of coefficients. The first sequence of coefficients corresponds to a transforming of a second sequence of coefficients. The first sequence of coefficients is associated with a transform domain and the second sequence of coefficients is associated with a frequency domain. The second sequence of coefficients corresponds to an output of differential operations on adjacent elements of a third sequence of coefficients. The elements of the third sequence of coefficients are associated with coefficients of a vector used to form a precoding matrix. The elements of the third sequence of coefficients are associated with frequency domain units.

In some embodiments, the differential operations are performed by performing any one of: dividing an element of the third sequence of coefficients by another element of the third sequence of coefficients, or dividing the another element of the third sequence of coefficients by the element of the third sequence of coefficients, where the element is associated with one sequence number of the third sequence of coefficients, and where the another element is associated with a sequence number immediately before the one sequence number of the third sequence of coefficients; a phase of an element associated with one sequence number of the third sequence of coefficients minus another phase of another element associated with a sequence number immediately before the one sequence number of the third sequence of coefficients; a phase of an element associated with a sequence number immediately before one sequence number of the third sequence of coefficients minus another phase of another element associated with the one sequence number of the third sequence of coefficients; a magnitude of an element of one sequence number of the third sequence of coefficients being divided by another magnitude of another element associated with a sequence number immediately before the one sequence number; and a magnitude of an element of a sequence number immediately before one sequence number of the third sequence of coefficients being divided by another magnitude of another element associated with the one sequence number.

In some embodiments, the second sequence of coefficients are transformed by performing any one of: a Discrete Fourier Transform (DFT), a Fast Fourier Transform (FFT) equivalent to the DFT, an inverse DFT (IDFT), an Inverse FFT (IFFT) equivalent to the IDFT, and multiplying the second sequence of coefficients as a column vector with a matrix, where a row vector in the matrix originates from a row vector in a DFT matrix or an IDFT matrix.

In some embodiments, the at least some elements of the first sequence of coefficients include elements characterizing direct current (DC) or zero frequency. In some embodiments, the at least some elements of the first sequence of coefficients include three elements having sequence numbers centered on the sequence number associated with DC.

In some embodiments, one element of the third sequence of coefficients is transmitted. In some embodiments, the one element in the third sequence of coefficients is associated with a middle sequence number. In some embodiments, the frequency domain units include subbands, subband groups, resource blocks, or resource block groups.

A second exemplary wireless communication method includes receiving, by a network node, at least some elements of a first sequence of coefficients. The at least some elements are located at fixed sequence positions in the first sequence of coefficients. The first sequence of coefficients corresponds to a transforming of a second sequence of coefficients. The first sequence of coefficients is associated with a transform domain and the second sequence of coefficients is associated with a frequency domain. The second sequence of coefficients corresponds to an output of differential operations on adjacent elements of a third sequence of coefficients. The elements of the third sequence of coefficients are associated with coefficients of a vector used to form a precoding matrix. The elements of the third sequence of coefficients are associated with frequency domain units. The second exemplary method also includes recovering the third sequence of coefficients based on the received at least some elements of the first sequence of coefficients.

In some embodiments, the at least some elements of the first sequence of coefficients include elements characterizing direct current (DC) or zero frequency. In some embodiments, the at least some elements of the first sequence of coefficients include three elements having sequence numbers centered on the sequence number associated with DC. In some embodiments, one element of the third sequence of coefficients is transmitted. In some embodiments, the one element in the third sequence of coefficients is associated with a middle sequence number. In some embodiments, the frequency domain units include subbands, subband groups, resource blocks, or resource block groups.

In yet another exemplary aspect, the above-described methods are embodied in the form of processor-executable code and stored in a computer-readable program medium.

In yet another exemplary embodiment, devices that are configured or operable to perform the above-described methods are disclosed.

The above and other aspects and their implementations are described in greater detail in the drawings, the descriptions, and the claims.

DETAILED DESCRIPTION

Section headers are used in the present document only for ease of understanding and do not limit the scope of the techniques and embodiments disclosed in each section only to that section. Furthermore, while 5G networking standard is used as an example for the benefit of understanding, the disclosed techniques may be applied to embodiments that use network protocol standards other than 5G or 3GPP standards.

This patent document describes techniques to improve transmission of precoding information to map a signal or data on a transmitting antenna for transmission. The exemplary techniques apply a precoding operation to a signal or data to be transmitted in a wireless communication system. The receiving side detects a reference signal sent by the transmitting side, acquires a channel coefficient, calculates a precoding matrix for the precoding operation according to the channel coefficient, and sends back the precoding matrix to the transmitting side. The precoding matrix may include only one column or may include multiple columns. Each column of the precoding matrix is linearly combined by a plurality of predefined vectors. These predefined vectors forming a precoding matrix can be referred to as base vectors.

In an exemplary embodiment, the precoding matrix sent back by the receiving side is generated by combining the base vectors of the precoding matrix with the base vectors' coefficients. Since the channel coefficients vary with frequency in the frequency domain, the coefficients of the base vectors also vary with frequency. To effectively use the frequency domain resources, the channel state in the frequency domain is reported, and the frequency domain is divided into frequency domain units. The frequency domain may be divided into sub-carriers, resource blocks, sub-bands, resource block groups, or sub-band groups, where multiple sub-carriers form one resource block (e.g., 12 sub-carriers form one resource block), multiple resource blocks form one sub-band (e.g., four resource blocks), or one sub-band (e.g., 8 resource blocks that form a sub-band), multiple resource blocks form a resource block group, or multiple sub-bands form a sub-band group.

As further described in this patent document, the exemplary techniques provide a reporting method for channel state information that can reduce redundant channel state information reporting overhead escalation, save reporting resources, and improve resource utilization.

Figure 1:
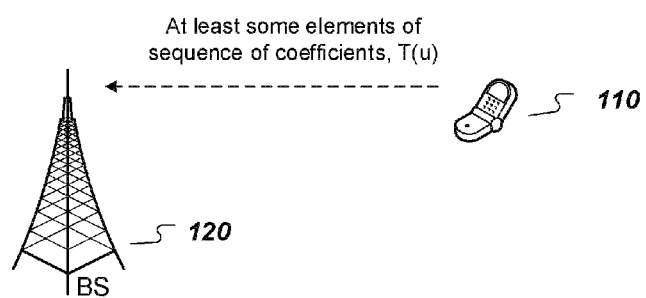
FIG. 1 shows an example of a communication node sending channel state information to a network node.

FIG. 1 shows an example of a communication node 110 sending channel state information to a network node 120. The communication node 110 may send at least some elements of a sequence of coefficients, T(u) based on operations performed on a precoding matrix, as further described in FIG. 2. The communication node 110 includes a user equipment and a network node 120 includes a base station.

Figure 2:
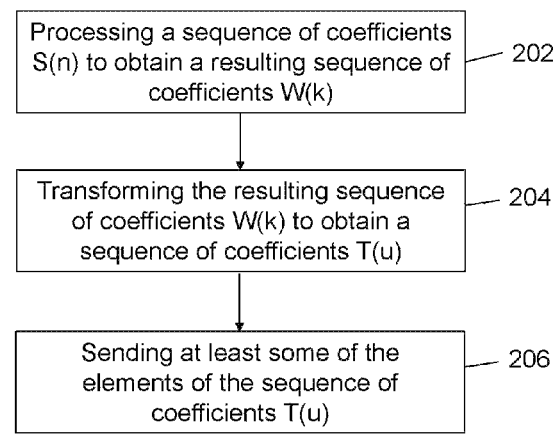
FIG. 2 shows an example of operations performed by a communication node to report channel state information.

FIG. 2 shows an example of operations performed by a communication node to report channel state information. At the processing operation 202, the communication node processes a sequence of coefficients S(n) used to form a vector of precoding matrix. The coefficient sequence S(n) of the vector is a sequence formed by values of the vector coefficients in a frequency domain unit. The communication node processes S(n) by performing differential operations on neighboring (or adjacent) elements located at adjacent frequency domain units in the sequence S(n) to produce a sequence W(k). The coefficients of the base vectors (i.e., predefined vectors that form a precoding matrix) form a sequence in successive frequency domain units. For example, the coefficients of the base vectors can form a sequence on successive resource blocks, or on a contiguous set of resource blocks, or on successive sets of sub-bands. As shown below, the precoding matrix is made up of some base vectors $P_j$. For example, A is the precoding matrix, $V_i$ is a column of A, and $V_i$ is the linear combination of vector $P_j$.

$$A = [\, V_0 \quad V_1 \quad V_2 \quad V_3 \,],$$

$$V_i = \sum_j c_j P_j$$

where $c_j$ is a coefficient of base vectors $P_j$, which has different values on different frequency domain units (e.g. subband). The values of $c_j$ on the subbands include the sequence of coefficients S(n). For example, the values of $c_j$ on subband 0 is S(0), S(1) on subband 1, . . . , S(n) on subband n, . . . , S(N−1) on subband N−1. Thus, the sequence of coefficients S(n) can be S(0), S(1), . . . , S(n), . . . , S(N−1).

At the transforming operation 204, the communication node transforms the resulting sequence W(k) associated with a first domain to obtain a sequence T(u) on a second domain. The first domain may be a frequency domain and a second domain may be a transform domain. The transform operation is further described in this patent document.

At the sending operation 206, the communication node sends or feeds back at least some of the elements in the sequence T(u) on the second domain, where the at least some elements of T(u) are located at fixed sequence positions.

The letter "n" is a sequence number of an element in the sequence of coefficients S(n), the letter "k" is a sequence number of an element in the sequence of coefficients W(k), and the letter "u" is a sequence number of an element in the sequence of coefficients T(u).

By performing a differential operation on the coefficient sequence in the adjacent frequency domain unit and by performing the transforming operation, most of the power of the resulting sequence may be clustered on a few elements in a fixed position. These operations can obtain at least some elements of fixed position, which occupy most power of the sequence T(u), and the number of the at least some elements is small, and the position is fixed. As a result, the overhead resources can be reduced for reporting and the accuracy of the channel state information report can be improved.

For example, the coefficients of a base vectors used to form a precoding matrix on subband 0, subband 1, subband 2, . . . , subband N−1 forms a sequence according to the subband order number: S(0), S(1), S(2), . . . , S(N−1). Differential operations can be performed on adjacent subbands of this sequence (e.g., on adjacent sequence elements of the sequence). By performing a differential operation, the communication node can generate sequences W(0), W(1), W(2), . . . , W(K−1) on a first or original domain (e.g., frequency domain). For example, S(0) and S(1) operate to generate W(0); S(2) and S(1) operate to generate W(1); . . . and S(N−1) and S(N−2) operate to generate W(N−2), where K is equal to N minus 1.

The sequences W(0), W(1), W(2), . . . , W(K−1) can be transformed to obtain the sequences T(0), T(1), T(2), . . . , T(U−1) on the new domain. In this patent document, the new domain can be a transform domain and can be referred to as the second domain. The communication node feeds back or sends back at least some elements in the sequence T(0), T(1), T(2), . . . T(U−1) on the second domain. Specifically, the communication may feedback at least some elements of the fixed position in T(0), T(1), T(2), . . . T(U−1).

In some embodiment, the coefficients of the base vectors that make up the precoding matrix are recovered in this way. For example, a receiving side (e.g., a network node) that receives the report can replace the element(s) not fed back in sequence T(u) with 0, which together with the feedback element in sequence T(u) form a sequence t(0), t(1), t(2), . . . , t(U−1) on the second domain. And with the sequence t(0), t(1), t(2), . . . , t(U−1), the inverse transformation is carried out to obtain the sequence w(0), w(1), w(2), . . . , w(K−1) on the first domain; the sequence w(0), w(1), w(2), . . . , w(K−1) can be regarded as an approximation the sequence W(0), W(1), W(2), . . . , W(K−1); with the sequence w(0), w(1), w(2), . . . , w(K−1) and an element of the sequence S(0), S(1), S(2), such as S(i), the sequence S(0), S(1), S(2), . . . S(N−1) can be recovered. With regard to the selection of S(i), this article will be further described. The letters N, K, U are positive integers.

The differential operation, as described above, can be performed by one of the following exemplary operations.

(1) the element associated with one sequence number in the sequence can be divided by the element immediately before the one sequence number in the sequence; or the element immediately before one sequence number in the sequence can be divided by the element associated with one sequence number in the sequence;

(2) The phase of the element associated with one sequence number in the sequence minus the phase of the element immediately before the one sequence number in the sequence; or the phase of the element immediately before one sequence number in the sequence minus the element associated with the one sequence number in the sequence (3) The magnitude of the element associated with the one sequence number in the sequence can be divided by the magnitude of the element immediately before the one sequence number in the sequence; or the magnitude of the element immediately before the one sequence number in the sequence can be divided by the magnitude of the element associated with the one sequence number in the sequence;

The division operation of (1) above is further explained below. For example, a differential operation is performed by the sequences S(0), S(1), S(2), . . . , S(N−1) to generate sequences W(0), W(1), W(2), . . . , W(K−1); where S(1) divided by S(0) produces W(0), S(2) divided by S(1) produces W(1), . . . , S(N−1) divided by S(N−2) produces W(N−2); or, S(0) divided by S(1) produces W(0), S(1) divide by S(2) to generate W(1), . . . , S(N−2) divided by S(N−1) to produce W(N−2); where K is equal to N minus 1.

The subtraction operation of (2) above is further explained below. For example, the phase of S(1) minus the phase of S(0) produces W(0), the phase of S(2) minus the phase of S(1) produces W(1), . . . , the phase of S(N−1) minus the phase of S(N−2) produces W(N−2); or, the phase of S(0) minus the phase of S(1) produces W(0), the phase of S(1) minus the phase of S(2) produce W(1), . . . , the phase of S(N−2) minus the phase of S(N−1) produces W(N−2).

The division operation of (1) above is further explained below. The amplitude value of S(1) can be divided by the amplitude value of S(0) to produce W(0), the amplitude value of S(2) can be divided by the amplitude value of S(1) to produce W (1), . . . , the amplitude value of S(N−1) is divided by the amplitude value of S(N−2) to produce W(N−2). Alternatively, the amplitude value of S(0) divided by the amplitude value of S(1) produces W(0), the amplitude value of S(1) divided by the amplitude value of S(2) to produce W(1), . . . , the amplitude value of S(N−2) is divided by the amplitude value of S(N−1) to produce W(N−2).

The transformation operation (e.g., as described in operation 204 of FIG. 2) may include performing one of the following:

(1) Discrete Fourier Transform (DFT), or Fast Fourier Transform (FFT) equivalent to DFT (2) Inverse DFT (IDFT), or Inverse FFT (IFFT) equivalent to IDFT (3) Multiply the sequence as a column vector with a first matrix, and the row vector in the first matrix originates from the row vector in the DFT matrix or the IDFT matrix.

One exemplary way to perform the transform operation is by performing a DFT transform, or an equivalent FFT transform. Another way to perform the transform operation is by performing a IDFT transform, or an equivalent IFFT transform. Yet, another way to perform the transform operation is to multiply the sequences W(0), W(1), W(2), . . . , W(K−1) as a column vector by a matrix A. The row vector in matrix A is derived from a row vector in a DFT matrix or an IDFT matrix.

As described in the sending operation 206 of FIG. 2, at least some elements of the sequence of coefficients T(u) in the transform domain are sent back to the network node. The at least some elements in T(u) are in fixed sequence numbers and may include elements or sequence numbers characterizing DC or zero frequency.

A small number of data centered on the DC or zero frequency sequence number occupies most of the power of the sequence, so feedback of the elements can feedback the coefficients of the base vectors with high precision and reduced overhead resource. The DC or zero frequency sequence number refers to a sequence number corresponding to a zero frequency or a DC vector in the DFT or the IDFT; the DC or zero domain vector is $$\left[ e^{j2\pi u \frac{0}{K-1}}, e^{j2\pi u \frac{1}{K-1}}, \ldots , e^{j2\pi u \frac{K-1}{K-1}} \right],$$

where u=0; or the DC or zero domain vector is $$\left[e^{-j2\pi u\frac{0}{K-1}}, e^{-j2\pi u\frac{1}{K-1}}, \ldots, e^{-j2\pi u\frac{K-1}{K-1}}\right],$$

where u=0; or the DC or zero domain vector is [1, 1, ..., 1], or the DC or 0 domain vectors is $[e^{j\varphi}, e^{j\varphi}, \ldots, e^{j\varphi}]$, where φ is a real number.

That is, in the transformation operation, the output element of the original sequence and the zero frequency or DC vector is the DC or the zero frequency component in the sequence T(u), the corresponding sequence number is the DC or the zero frequency sequence number. Set the zero frequency sequence number to H, if the sequence number counts from 0, then the sequence numbers of the fed some elements in sequence T(u) are (H−L) mod (U), (H−L+1) mod (U), ..., (H) mod (U), ..., (H+L−1) mod (U), (H+L) mod (U). If the sequence number counts from 1, then the sequence numbers of the fed some elements in sequence T(u) are (H−L−1) mod (U)+1, (H−L+1−1) mod (U)+1, ..., (H−1) mod (U)+1, ..., (H+L−1−1) mod (U)+1, (H+L−1) mod (U)+1; where the mod is a modulus operation, the mod (U) represents divided by U to calculate the remainder, and U represents the length of the sequence. The number of elements of feedback is 2L+1.

In some embodiments, the communication may send back to the network node elements related to the three sequence or ordinal numbers centered on the DC sequence number. Typically, the three elements centered on the DC sequence number in sequence T(u) in the second domain occupy most of the power of the sequence. Therefore, the elements on the three sequence or ordinal numbers centered on the DC sequence number can be fed back. For example, the element of the direct current has a sequence number of 0, the length of the sequence is U, and the feedback's sequence numbers are U−1, 0, 1. For example, the sequence number of the element of the direct current is 1, the sequence number is counted from 0, the length of the sequence is U, and feedback's sequence number is 0, 1, 2. For example, the sequence number of the element of the direct current is 1, the sequence number is counted from 1, the length of the sequence is U, and the feedback's sequence number is T, 1, 2.

In some embodiments, the communication node can send back to the network node one element of the sequence of coefficient S(n). In some embodiments, the one element sent back by the communication node is the coefficient located in the middle sequence number of S(n).

According to the above discussion, a sequence of coefficients can be recovered by the network node using partial elements in the transformed transform domain sequence T(u) and an element in the sequence of coefficients S(n). Therefore, any element in the sequence of coefficients S(n) can be fed back.

The feedback side (e.g., communication node) may calculate the first element or the tail element in the sequence to be more profitable, so the first element or the tail element in the sequence S(n) can be fed back. The element in the middle of the feedback coefficient sequence can improve the accuracy of the sequence of the recovery operation performed by the receiving side (e.g., network node), so the element of feedback in the sequence S(n) is located in the middle sequence. The sequence number of the sequence is set to $N_0$, the tail number is to $N_1$, and the middle sequence number is $$\frac{N_0 + N_1}{2}$$

rounding up or down.

For example, if the sequence number starts from 0 and the tail sequence number is N, then the middle sequence number is $$\frac{N-1}{2}$$

rounding up or down.

The description below shows some of the benefits of the exemplary channel state reporting technique described above.

I.A Treatment and Observation of the Coefficients of Beam Vector on 16 Subband: (Direct DFT Scheme Vs Differential DFT Scheme)

The coefficients of a beam vector in the example contains 4 clusters or taps.

Figure 3:
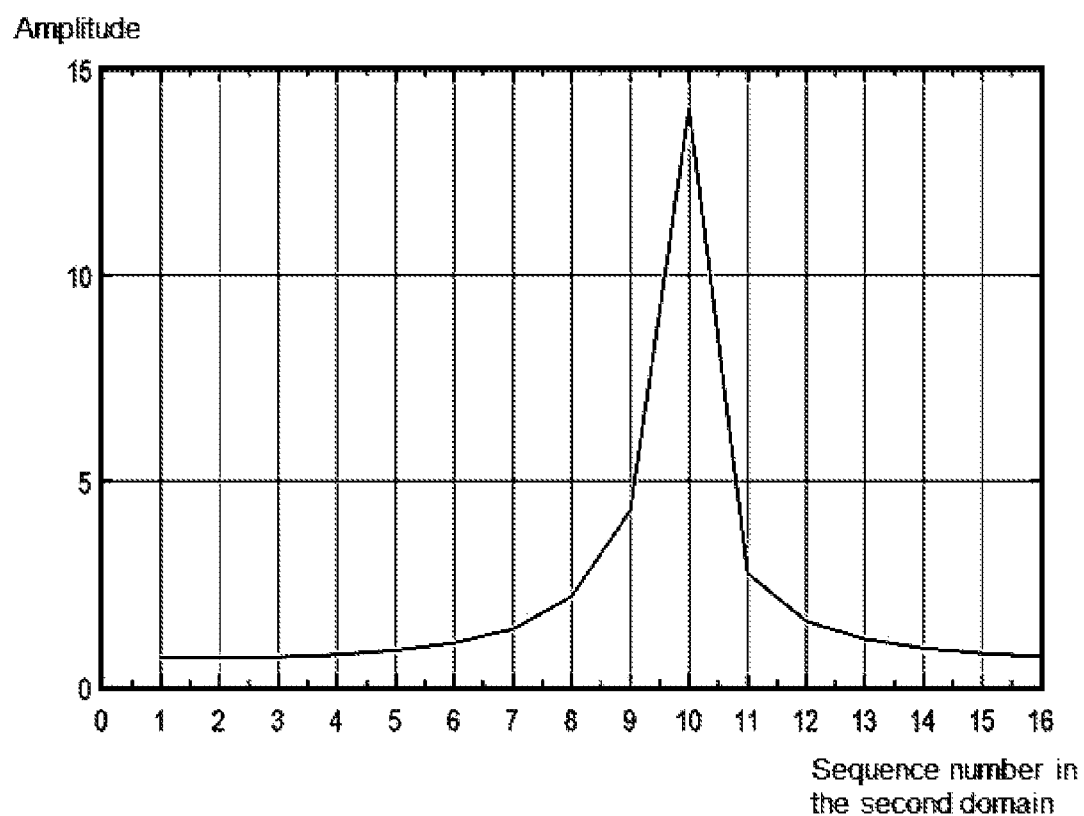
FIG. 3 shows a Discrete Fourier Transform (DFT) of a sequence of coefficients S(n) of a beam vector.
Figure 4:
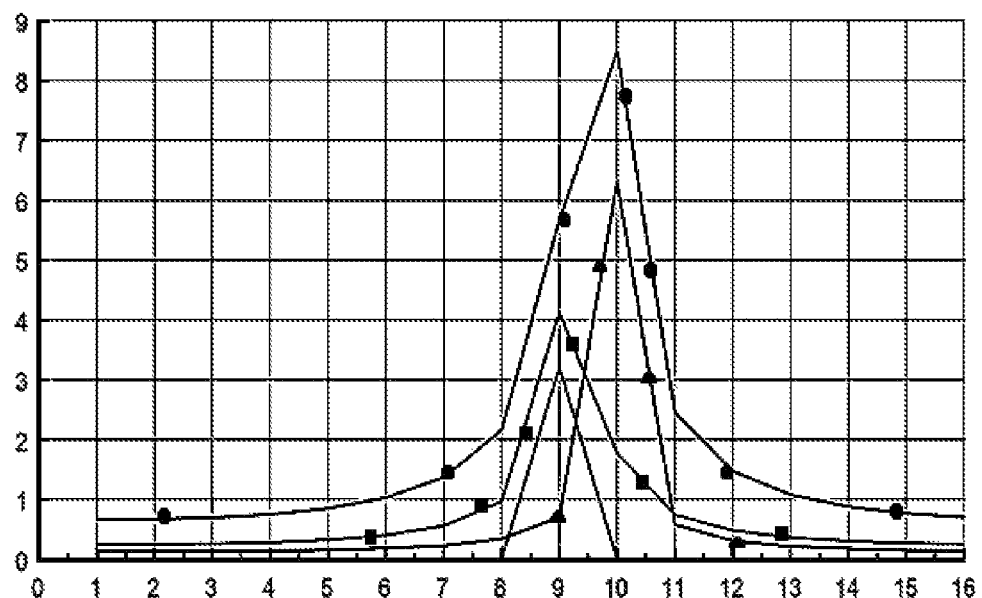
FIG. 4 shows DFT of four cluster components in a sequence of coefficients S(n) of a beam vector.

A first scenario includes an amplitude value of the beam vector's coefficients being observed directly after it has been DFT. FIG. 3 shows an DFT of a beam vector's coefficients and FIG. 4 shows DFT of four cluster components in the beam vector's coefficients. The four cluster components in the beam vector's coefficients correspond to the four transmission paths in spatial beam direction corresponding to the beam vector. And the beam vector's coefficient sequence is sum of the four cluster components. The different positions of the four clusters in FIG. 4 indicate the four paths have different delays.

I.B Perform Frequency Domain Sub-Band Differential Processing on the Frequency Domain Coefficients of the Beam, and then DFT The steps of differential processing between the frequency domain subbands are as:

1) The coefficients of beam on subband_0, subband_1, ..., subband_N−1 are: S(0), S(1), ..., S(N−1);

2) The relative value (differential value) of the coefficient between Subbands is: W(0), ..., W(K−1);

Where W(0)=S(1)/S(0), ..., W(K−1)=S(K)/S(K−1);

3) Perform DFT mode on W(0), ..., W(K−1), and select 3 points for feedback based on the 0 number.

Figure 5:
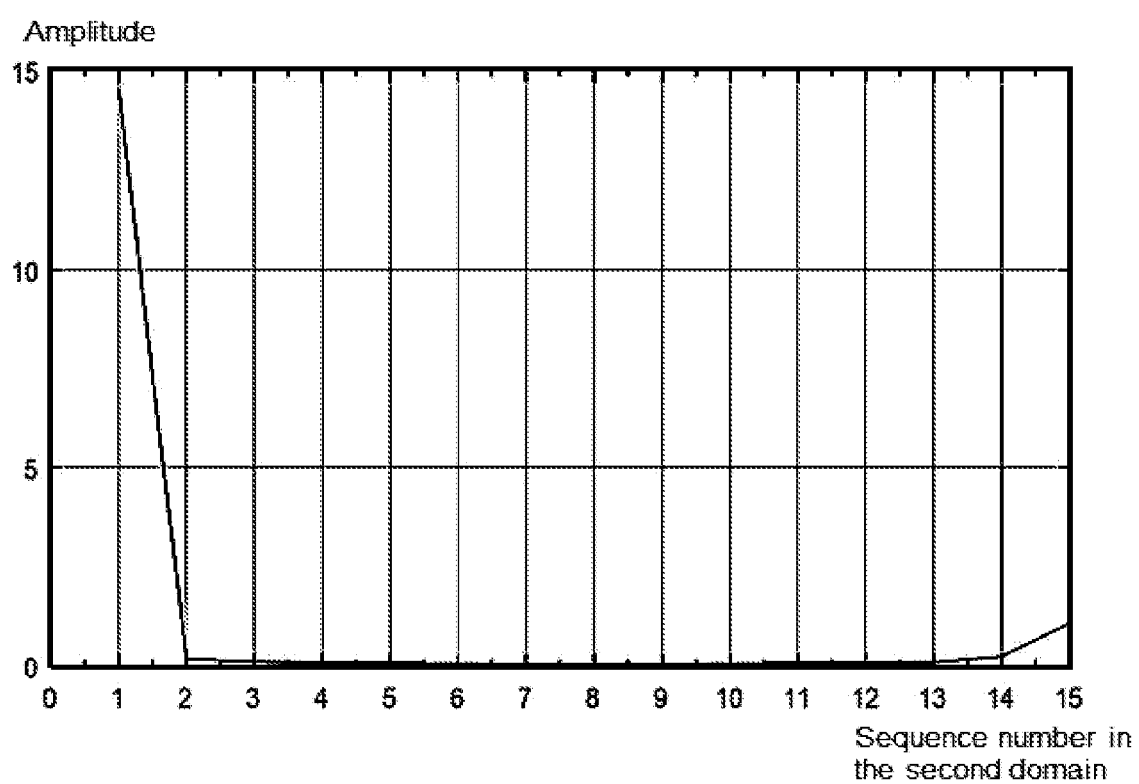
FIG. 5 shows DFT after coefficient difference.

FIG. 5 shows DFT after coefficient difference.

II. Data Distribution Comparison: Direct DFT and Differential DFT Data (Amplitude)

Table 1 shows a data distribution comparison between direct DFT, and differential DFT for different sequence numbers.

TABLE 1

| | Sequence number | | | | | | | |
|---|---|---|---|---|---|---|---|---|
| | 0 | 1 | 2 | 3 | 4 | 5 | 6 | 7 |
| Direct DFT | 0.7131 | 0.7084 | 0.7318 | 0.7880 | 0.8909 | 1.0720 | 1.4142 | 2.2042 |
| Differential DFT | 14.544 | 0.1789 | 0.1129 | 0.0849 | 0.0704 | 0.0624 | 0.0583 | 0.0570 |
| | Sequence number | | | | | | | |
| | 8 | 9 | 10 | 11 | 12 | 13 | 14 | 15 |
| Direct DFT | 4.2891 | 14.033 | 2.7555 | 1.6032 | 1.1630 | 0.9411 | 0.8167 | 0.7467 |
| Differential DFT | 0.0582 | 0.0622 | 0.0703 | 0.0840 | 0.0966 | 0.2409 | 1.0768 | |

The following observations can be made:

1) The data of the direct DFT is more dispersed, and there are 8 data larger than 1; and the peak position is the sequence number 9, that is, the peak position is not fixed.

2) Differential DFT dataset, more than 1 of the number of data is only 2, and the peak serial number fixed to 0, that is, can usually only feedback the point values of fixed sequence number on: sequence number 0, sequence number 1, sequence number 14

3) From the first two conclusions, we can get: If only the value of 3 points is fed back, the differential DFT will be more accurate than the direct DFT.

That is, the energy of differential DFT is concentrated at 3 points in a fixed position, which determines the higher precision feedback that can be made with fewer bits.

III. ERROR OF THE COEFFICIENT OF BEAM VECTOR OBTAINED BY DIFFERENTIAL DFT SCHEME

By taking three points of differential DFT for feedback, the following can be observed:

(1) In the case of no quantization error feedback: the error of the phase of the obtained beam vector coefficients on the subbands is as follows: (accumulated error has been considered), where the maximum error is $\pi/48$.

TABLE 2

| | Subband number | | | | | | | |
|---|---|---|---|---|---|---|---|---|
| | 0 | 1 | 2 | 3 | 4 | 5 | 6 | 7 |
| the error | 0.000 | 0.0481 | 0.0645 | 0.0584 | 0.0415 | 0.0254 | 0.0185 | 0.0230 |
| | Subband number | | | | | | | |
| | 8 | 9 | 10 | 11 | 12 | 13 | 14 | 15 |
| the error | 0.0345 | 0.0451 | 0.0488 | 0.0455 | 0.0391 | 0.0315 | 0.0206 | 0.0026 |

(2) in the case of quantitative error feedback: The error of the phase of the coefficient obtained by the beam vector on the subbands is as follows: (accumulated error has been considered). The maximum error is $\pi/12$

TABLE 3

| | Subband number | | | | | | | |
|---|---|---|---|---|---|---|---|---|
| | 0 | 1 | 2 | 3 | 4 | 5 | 6 | 7 |
| the error | 0.000 | 0.077 | 0.133 | 0.168 | 0.184 | 0.182 | 0.165 | 0.131 |
| | Subband number | | | | | | | |
| | 8 | 9 | 10 | 11 | 12 | 13 | 14 | 15 |
| the error | 0.082 | 0.016 | −0.059 | −0.135 | −0.197 | −0.239 | −0.261 | −0.268 |

Cost Calculation:

Sampling point with a post-DFT index number of 0: phase 7 bit. The amplitude of the sampling point with the index number of 1.14 after DFT: 3 bit*2=6 bit; phase 2 bit*2=4 bit Phase of the beam coefficient on the reference subband: 3 bit That is, the phase feedback of one beam is total: 20 bit. If the feedback accuracy is lowered and the middle position of the reference subband selection is considered, the feedback overhead can be further reduced to provide performance not lower than normal CSI feedback type II.

IV. Conclusion

With differential DFT, a performance of no lower than normal CSI feedback type II can be achieved with less than the overhead normal CSI feedback type II.

V. The Principle of Differential DFT Scheme

| Program | Principle explanation |
| --- | --- |
| The coefficients of beam on subband_0, subband_1, . . . , subband_N-1 are: S(0), S(1), . . . , S(N-1); | Can be thought of as a signal sequence, looking at the following steps from a signal processing perspective |
| The difference between the coefficients of the subband is obtained according to the following actions: W(0), . . . , W(K-1); Among them, W(0), S(1)/S(0), . . . , W(K-1) = S(K)/S(K-1); | This is a down conversion operation and is zero IF. A copy of the sequence is used as the reference carrier signal, such reference carrier signal being only one phase out of phase with the sequence itself. On the other hand, such a reference carrier signal is not a single carrier, but a combination of multiple components, that is, each component of the signal sequence can be frequency-converted to near zero frequency; that is, it has the effect of narrowing the spectral width of the signal. |
| The DFT mode is performed on D_1, . . . , D_K, and three points are selected with the 0 number as the center for feedback. | These 3 points are fixed, representing most of the energy of the signal, and also represent the spectrum of the signal. |

Figure 6:
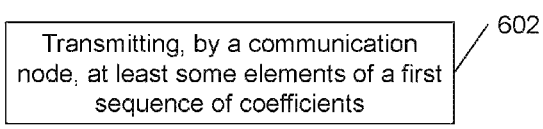
FIG. 6 shows an example flowchart of operations performed by a communication node.

FIG. 6 shows an example flowchart of operations performed by a communication node. At the transmitting operation, a communication node, such as a user equipment, transmits at least some elements of a first sequence of coefficients (e.g., T(u)). The at least some elements are located at fixed sequence positions in the first sequence of coefficients. The first sequence of coefficients corresponds to a transforming of a second sequence of coefficients (e.g., W(k)). For example, using the techniques described in this patent document, the communication node may transform the second sequence of coefficients to obtain the first sequence of coefficients. The first sequence of coefficients is associated with a transform domain and the second sequence of coefficients is associated with a frequency domain.

The second sequence of coefficients corresponds to an output of differential operations on adjacent elements of a third sequence of coefficients (e.g., S(n)). For example, using the techniques described in this patent document, the communication node may perform differential operations on adjacent or neighboring elements of the third sequence of coefficients to obtain the second sequence of coefficients. The elements of the third sequence of coefficients are associated with coefficients of a vector used to form a precoding matrix, and the elements of the third sequence of coefficients are associated with frequency domain units.

In some embodiments, the communication node may perform the differential operations by performing any one of following operations:

(1) dividing an element of the third sequence of coefficients by another element of the third sequence of coefficients, or dividing the another element of the third sequence of coefficients by the element of the third sequence of coefficients, where the element is associated with one sequence number of the third sequence of coefficients, and where the another element is associated with a sequence number immediately before the one sequence number of the third sequence of coefficients;

(2) a phase of an element associated with one sequence number of the third sequence of coefficients minus another phase of another element associated with a sequence number immediately before the one sequence number of the third sequence of coefficients;

(3) a phase of an element associated with a sequence number immediately before one sequence number of the third sequence of coefficients minus another phase of another element associated with the one sequence number of the third sequence of coefficients;

(4) a magnitude of an element of one sequence number of the third sequence of coefficients being divided by another magnitude of another element associated with a sequence number immediately before the one sequence number; and (5) a magnitude of an element of a sequence number immediately before one sequence number of the third sequence of coefficients being divided by another magnitude of another element associated with the one sequence number.

In some embodiments, the communication node transforms the second sequence of coefficients by performing any one of: a Discrete Fourier Transform (DFT), a Fast Fourier Transform (FFT) equivalent to the DFT, an inverse DFT (IDFT), an Inverse FFT (IFFT) equivalent to the IDFT, and multiplying the second sequence of coefficients as a column vector with a matrix, where a row vector in the matrix originates from a row vector in a DFT matrix or an IDFT matrix.

In some embodiments, the at least some elements of the first sequence of coefficients include elements characterizing direct current (DC) or zero frequency. In some embodiments, the at least some elements of the first sequence of coefficients include three elements having sequence numbers centered on the sequence number associated with DC.

In some embodiments, one element of the third sequence of coefficients is transmitted. In some embodiments, the one element in the third sequence of coefficients is associated with a middle sequence number. In some embodiments, the frequency domain units include subbands, subband groups, resource blocks, or resource block groups.

Figure 7:
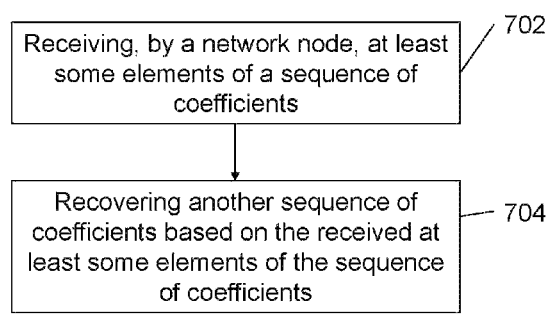
FIG. 7 shows an example flowchart of operations performed by a network node.

FIG. 7 shows an example flowchart of operations performed by a network node. At the receiving operation 702, a network node receives at least some elements of a sequence of coefficients (i.e., a first sequence of coefficients, e.g., T(u)). The at least some elements are located at fixed sequence positions in the first sequence of coefficients. The first sequence of coefficients corresponds to a transforming of a second sequence of coefficients (e.g., W(k)). The first sequence of coefficients is associated with a transform domain and the second sequence of coefficients is associated with a frequency domain. The second sequence of coefficients corresponds to an output of differential operations on adjacent elements of a third sequence of coefficients (e.g., S(n)). The elements of the third sequence of coefficients are associated with coefficients of a vector used to form a precoding matrix. The elements of the third sequence of coefficients are associated with frequency domain units.

At the recovering operation, the network node recovers another sequence of coefficients (i.e., the third sequence of coefficients (S(n)) based on the received at least some elements of the first sequence of coefficients.

In some embodiments, the at least some elements of the first sequence of coefficients include elements characterizing direct current (DC) or zero frequency. In some embodiments, the at least some elements of the first sequence of coefficients include three elements having sequence numbers centered on the sequence number associated with DC. In some embodiments, one element of the third sequence of coefficients is transmitted. In some embodiments, the one element in the third sequence of coefficients is associated with a middle sequence number. In some embodiments, the frequency domain units include subbands, subband groups, resource blocks, or resource block groups.

Figure 8:
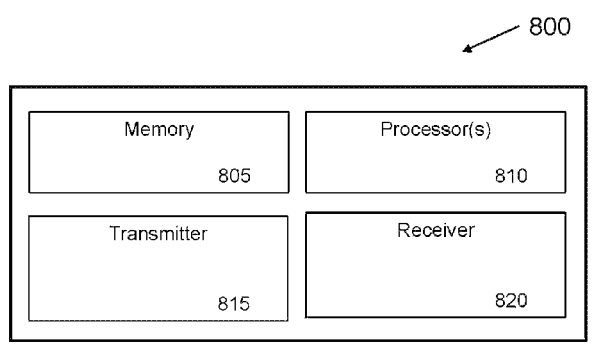
FIG. 8 shows an exemplary block diagram of a hardware platform.

FIG. 8 shows an exemplary block diagram of a hardware platform 800 that may be a part of a network node, such as base station, or a communication node, such as a user equipment. The hardware platform 800 includes at least one processor 810 and a memory 805 having instructions stored thereupon. The instructions upon execution by the processor 810 configure the hardware platform 800 to perform the operations described for FIGS. 1, 2, 6 and 7 and in the various embodiments described in this patent document. The transmitter 815 transmits or sends information or data to another node. For example, a communication node transmitter can send at least some of the elements of sequence of coefficients T(u) to a network node. The receiver 820 receives information or data transmitted or sent by another node. For example, communication node can receive information from a network node.

In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A wireless communication method, comprising:
   obtaining, by a communication node, a second sequence of coefficients by performing differential operations on adjacent elements of a third sequence of coefficients,
      wherein the elements of the third sequence of coefficients are associated with coefficients of a vector to form a precoding matrix, and
      wherein the elements of the third sequence of coefficients are associated with frequency domain units;
   obtaining, by the communication node, a first sequence of coefficients by performing a transform operation on the second sequence of coefficients,
      wherein the first sequence of coefficients is associated with a transform domain and the second sequence of coefficients is associated with a frequency domain; and
   transmitting, by the communication node, at least some elements of the first sequence of coefficients,
   wherein the at least some elements are located at fixed sequence positions in the first sequence of coefficients.

2. The method of claim 1, wherein the differential operations are performed by dividing an element of the third sequence of coefficients by another element of the third sequence of coefficients, or dividing the another element of the third sequence of coefficients by the element of the third sequence of coefficients,
- wherein the element is associated with one sequence number of the third sequence of coefficients, and
- wherein the another element is associated with a sequence number immediately before the one sequence number of the third sequence of coefficients.

3. The method of claim 1, wherein the differential operations are performed by subtracting a phase of an element associated with one sequence number of the third sequence of coefficients from another phase of another element associated with a sequence number immediately before the one sequence number of the third sequence of coefficients.

4. The method of claim 1, wherein the differential operations are performed by subtracting a phase of an element associated with a sequence number immediately before one sequence number of the third sequence of coefficients from another phase of another element associated with the one sequence number of the third sequence of coefficients.

5. The method of claim 1, wherein the differential operations are performed by dividing a magnitude of an element of one sequence number of the third sequence of coefficients by another magnitude of another element associated with a sequence number immediately before the one sequence number.

6. The method of claim 1, wherein the differential operations are performed by dividing a magnitude of an element of a sequence number immediately before one sequence number of the third sequence of coefficients by another magnitude of another element associated with the one sequence number.

7. The method of claim 1, wherein the at least some elements of the first sequence of coefficients include elements characterizing direct current (DC) or zero frequency.

8. The method of claim 1, wherein the differential operations include a mathematical operation performed on the adjacent elements of the third sequence of coefficients to obtain relative values, wherein each relative value in the second sequence of coefficients describes a mathematical relationship between two adjacent values.

9. A communication node, comprising a memory and a processor, wherein the processor is configured to read code from the memory to implement a method, the method comprising:
- obtaining a second sequence of coefficients in response to differential operations being performed on adjacent elements of a third sequence of coefficients,
  - wherein the elements of the third sequence of coefficients are associated with coefficients of a vector to form a precoding matrix, and
  - wherein the elements of the third sequence of coefficients are associated with frequency domain units;
- obtaining a first sequence of coefficients in response to a transform operation being performed on the second sequence of coefficients,
  - wherein the first sequence of coefficients is associated with a transform domain and the second sequence of coefficients is associated with a frequency domain; and
- transmitting at least some elements of the first sequence of coefficients,
  - wherein the at least some elements are located at fixed sequence positions in the first sequence of coefficients.

10. The communication node of claim 9, wherein the differential operations are performed by the processor configured to divide an element of the third sequence of coefficients by another element of the third sequence of coefficients, or divide the another element of the third sequence of coefficients by the element of the third sequence of coefficients,
- wherein the element is associated with one sequence number of the third sequence of coefficients, and
- wherein the another element is associated with a sequence number immediately before the one sequence number of the third sequence of coefficients.

11. The communication node of claim 9, wherein the differential operations are performed by the processor configured to subtract a phase of an element associated with one sequence number of the third sequence of coefficients from another phase of another element associated with a sequence number immediately before the one sequence number of the third sequence of coefficients.

12. The communication node of claim 9, wherein the differential operations are performed by the processor configured to subtract a phase of an element associated with a sequence number immediately before one sequence number of the third sequence of coefficients from another phase of another element associated with the one sequence number of the third sequence of coefficients.

13. The communication node of claim 9, wherein the differential operations are performed by the processor configured to divide a magnitude of an element of one sequence number of the third sequence of coefficients by another magnitude of another element associated with a sequence number immediately before the one sequence number.

14. The communication node of claim 9, wherein the differential operations are performed by the processor configured to divide a magnitude of an element of a sequence number immediately before one sequence number of the third sequence of coefficients by another magnitude of another element associated with the one sequence number.

15. The communication node of claim 9, wherein the at least some elements of the first sequence of coefficients include elements characterizing direct current (DC) or zero frequency.

16. The communication node of claim 9, wherein the differential operations include a mathematical operation that the processor is configured to performed on the adjacent elements of the third sequence of coefficients to obtain relative values, wherein each relative value in the second sequence of coefficients describes a mathematical relationship between two adjacent values.

17. A non-transitory computer readable program storage medium having code stored thereon, the code, when executed by a processor, causing the processor to implement a method, comprising:
- obtaining, by a communication node, a second sequence of coefficients by performing differential operations on adjacent elements of a third sequence of coefficients,
  - wherein the elements of the third sequence of coefficients are associated with coefficients of a vector to form a precoding matrix, and
  - wherein the elements of the third sequence of coefficients are associated with frequency domain units;
- obtaining, by the communication node, a first sequence of coefficients by performing a transform operation on the second sequence of coefficients,
  - wherein the first sequence of coefficients is associated with a transform domain and the second sequence of coefficients is associated with a frequency domain; and transmitting, by the communication node, at least some elements of the first sequence of coefficients,
wherein the at least some elements are located at fixed sequence positions in the first sequence of coefficients.

18. The non-transitory computer readable program storage medium of claim 17, wherein the differential operations are performed by dividing an element of the third sequence of coefficients by another element of the third sequence of coefficients, or dividing the another element of the third sequence of coefficients by the element of the third sequence of coefficients,
wherein the element is associated with one sequence number of the third sequence of coefficients, and
wherein the another element is associated with a sequence number immediately before the one sequence number of the third sequence of coefficients.

19. The non-transitory computer readable program storage medium of claim 17, wherein the differential operations are performed by subtracting a phase of an element associated with one sequence number of the third sequence of coefficients from another phase of another element associated with a sequence number immediately before the one sequence number of the third sequence of coefficients.

20. The non-transitory computer readable program storage medium of claim 17, wherein the differential operations are performed by subtracting a phase of an element associated with a sequence number immediately before one sequence number of the third sequence of coefficients from another phase of another element associated with the one sequence number of the third sequence of coefficients.

* * * * *

UNITED STATES PATENT AND TRADEMARK OFFICE
CERTIFICATE OF CORRECTION

PATENT NO. : 11,316,565 B2
APPLICATION NO. : 17/245598
DATED : April 26, 2022
INVENTOR(S) : Li et al.

It is certified that error appears in the above-identified patent and that said Letters Patent is hereby corrected as shown below:

In the Specification

In Column 5, Line 60, delete "sequence" and insert -- sequence; --, therefor.

In Column 5, Line 67, delete "sequence;" and insert -- sequence. --, therefor.

In Column 9, Line 27, delete "number 14" and insert -- number 14. --, therefor.

In Column 10, Line 51, delete "$\pi/12$" and insert -- $\pi/12.$ --, therefor.

In Column 11, Line 4, delete "1.14" and insert -- 1,14 --, therefor.

In Column 11, in TABLE, Line 27, delete "perspective" and insert -- perspective. --, therefor.

In Column 11, in TABLE, Line 33, delete "W(0)," and insert -- W(0)= --, therefor.

In Column 13, Line 49, delete "digital versatile discs (DVD)," and insert -- digital versatile discs (DVDs), --, therefor.

In the Claims

In Column 16, Line 44, in Claim 16, delete "performed" and insert -- perform --, therefor.

Signed and Sealed this
Twenty-eighth Day of June, 2022

Katherine Kelly Vidal
*Director of the United States Patent and Trademark Office*